July 18, 1961

E. PEARSON ET AL 2,992,456

METHOD OF COMPOUNDING FINELY-DIVIDED THERMOPLASTIC
MATERIAL WITH A PLASTICIZER

Filed June 24, 1954

E. PEARSON
J. P. H. KING
INVENTORS

ATTORNEYS

United States Patent Office 2,992,456
Patented July 18, 1961

2,992,456
METHOD OF COMPOUNDING FINELY-DIVIDED THERMOPLASTIC MATERIAL WITH A PLASTICIZER
Eric Pearson and John Philip Henry King, both of Wrexham, Wales, assignors to British Celanese Limited, a corporation of Great Britain
Filed June 24, 1954, Ser. No. 439,095
Claims priority, application Great Britain May 10, 1954
9 Claims. (Cl. 18—47.5)

This invention relates to compounding, and especially to the incorporation of plasticisers into thermoplastic materials by mechanical means, and provides a novel process for this purpose.

The present invention provides a very advantageous way of incorporating plasticiser with thermoplastic material. In the process of the invention finely-divided thermoplastic material is compounded with a plasticiser in liquid condition by bringing successive portions of the thermoplastic material into contact with a layer of plasticiser carried on a rotating cylindrical surface past which the thermoplastic material is carried in a direction perpendicular to the axis of rotation. In a preferred method of carrying out the invention the thermoplastic material is continuously fed to the pass between a pair of nearly contacting rotating nip-rolls, and to each roll the plasticiser is continuously applied at a uniform rate at a point remote from the pass so as to maintain on that roll a layer of plasticiser extending from that point into the pass. The finely-divided thermoplastic material is thereby impregnated with plasticiser and compressed and the resulting composition is continuously delivered from the outlet side of the pass between the rolls.

In general terms, the apparatus used in carrying out the invention comprises a rotatable roll, means for positively driving said roll, means for continuously applying the plasticiser to the roll so as to maintain a film of plasticiser thereon, and means for continuously carrying the thermoplastic material past the roll and in contact with the layer of plasticiser thereon.

Preferably, the apparatus comprises a pair of nearly contacting nip-rolls mounted for rotation about axes that are parallel and in the same horizontal plane, means for positively driving the two nip rolls in opposite directions and at the same peripheral speed, means for continuously supplying the plasticiser to each nip-roll at a point remote from the pass between them so as to maintain on that roll a layer of plasticiser extending from that point to said pass, and means for continuously feeding the thermoplastic material into said pass, and means situated beyond said pass for removing any material sticking to the nip-rolls.

Figure 1:
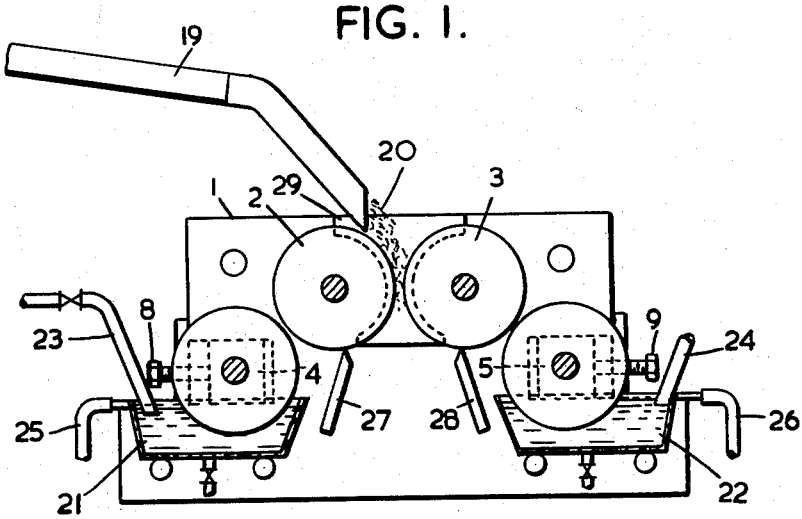
Figure 2:
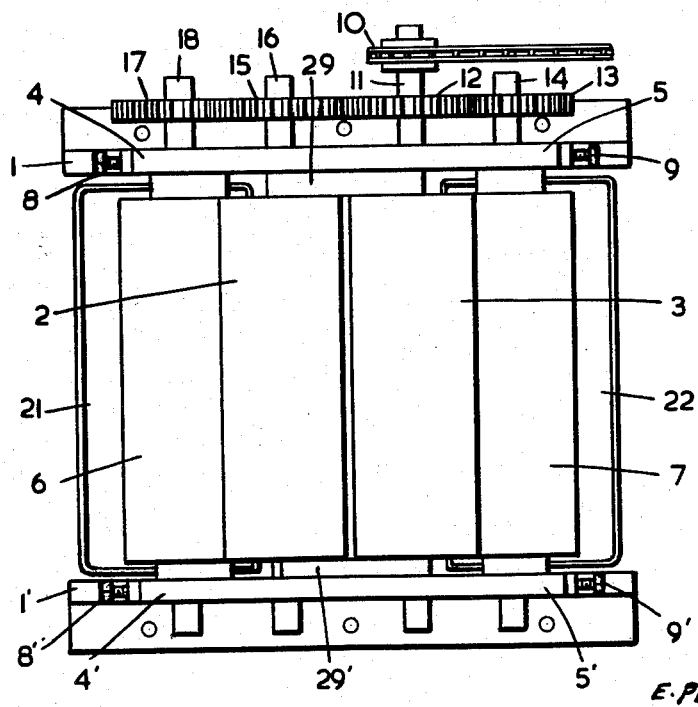

A preferred form of apparatus used in carrying out invention is shown by way of example in the accompanying diagrammatic drawings, in which:
FIGURE 1 is an end elevational view of the apparatus with one side-plate of the frame removed; and
FIGURE 2 is a plan view of the apparatus with the piping and the chute removed.

In fixed bearings carried by a pair of side-plates 1 and 1′, forming part of a rigid frame, are rotatably mounted two steel nip-rolls 2 and 3. The pass between the nip-rolls is between 0.005 and 0.02″ wide.

Slidably mounted on the side-plates 1 and 1′ are bearing blocks 4, 4′, 5 and 5′, in which are rotatably mounted two steel furnishing rolls 6 and 7. Micro-adjusting screws 8, 8′, 9 and 9′, carried by the frame, enable the position of the bearing blocks to be varied so as to vary the pass between the furnishing rolls and the corresponding nip-rolls.

The drive is from an electric motor through a positive infinitely variable gear-box (neither shown) to the sprocket 10 on the axle 11 of the nip roll 3. This axle carries a spur-wheel 12 meshing with a spur-wheel 13 on the axle 14 of the furnishing roll 7 and with a spur-wheel 15 on the axle 16 of the nip-roll 2. The spur-wheel 15 in turn meshes with a spur-wheel 17 on the axle 18 of the furnishing roll 6. Thus, all the rolls are positively driven at the same speed, the two nip-rolls rotating in opposite directions and each furnishing roll rotating in the opposite direction to the corresponding nip-roll.

Above the frame is mounted an electromagnetically vibrated chute 19 for delivering the powdered thermoplastic material 20 to the pass between the nip-rolls 2 and 3.

The furnishing rolls 4 and 5 dip into plasticiser tanks 21 and 22 provided with inlet pipes 23 and 24 for the plasticiser, and overflow pipes 25 and 26 therefor.

The furnishing rolls 2 and 3 are provided with doctor blades 27 and 28, adjustably mouned on the frame and extending along the whole length of each roll, to remove any of the plasticised thermoplastic material that sticks to nip-rolls.

Carried by the side-plates 1 and 1′ are two cheek-plates 29 and 29′, which contact the ends of the nip-rolls so as to retain the thermoplastic material in the pass between these rolls.

In operation, for a given rate of feed by the chute, the roll speed is adjusted so as to maintain a bank of the material in the pass between the nip-rolls. The furnishing rolls pick up plasticiser from the troughs and transfer it to the nip-rolls so that it is present thereon in the form of a thin external coating layer. The coated nip-rolls then meet the finely-divided thermoplastic material, which has been introduced as described, and during its passage through the pass between the nip-rolls impregnate and compress it to yield the desired composition. By adjustment of the micro-screws the gap between each furnishing roll and the corresponding nip-roll is adjusted to give the desired take-up of plasticiser. The plasticised thermoplastic material drops continuously away from the pass between the nip-rolls onto a chute situated below those rolls (not shown).

It has been found for relatively viscous plasticisers, e.g. triacetin, which show little tendency to run off the nip-rolls in the interval between application thereonto and meeting the finely-divided thermoplastic material, that the plasticiser content of the composition depends only on the separation between the nip and the furnishing rolls. In the case of less viscous plasticisers, e.g. diethyl phthalate, the relation is still true above a certain minimum roll speed, this minimum roll speed depending in each case on the particular value of the viscosity of the plasticiser.

The output of the apparatus is determined by the speed at which it is run.

In a modified form of the apparatus the pass between the nip-rolls is adjustable as well as the pass between each nip-roll and the corresponding furnishing roll. With smaller gaps between the nip-rolls smaller nip-furnishing roll gaps will in general be required.

The process may be carried out at room temperature, e.g. 15–25° C., even with plasticisers that are substantially without solvent power for the thermoplastic at these temperatures. On the other hand higher temperatures can be employed, e.g. 50–100° C., or even up to 180° C., according to the solvent power of the plasticiser. Naturally the temperature must be sufficiently high for the plasticiser to be in the liquid condition.

The composition emerging from the nip-rolls may be subjected to a further compounding operation, e.g. on hot rolls, or in a Banbury mixer, or in an extruder mixer, preferably after substantially drying off any moisture that it contains. It may then be sheeted and subsequently broken or cut up to the particle size desired for moulding or extrusion.

In the following examples which illustrate the invention the apparatus was as specifically described above, each roll being 3" in diameter and 6¾" long, and the pass between the nip-rolls being 0.018". The thermoplastic was finely-divided cellulose acetate, of acetyl value (expressed as combined acetic acid) between 53 and 55%, ground to pass through a 40 mesh sieve and the plasticiser was triacetin. The system of rolls was driven at various speeds within the range 15–54 r.p.m., and the pass between each nip-roll and the corresponding furnishing roll was varied within the range 0.0025–0.0038", as shown below.

| Example | Nip-roll Speed (r.p.m.) | Nip-furnishing roll pass (mils) | Plasticiser content (weight percentage) |
| --- | --- | --- | --- |
| 1 | 15 | 2.5 | 20 |
| 2 | 30 | 2.5 | 20 |
| 3 | 54 | 2.5 | 20 |
| 4 | 20 | 3.1 | 24.5 |
| 5 | 40 | 3.1 | 24.5 |
| 6 | 54 | 3.1 | 24.5 |
| 7 | 30 | 3.5 | 27.5 |
| 8 | 54 | 3.5 | 27.5 |
| 9 | 20 | 3.8 | 30 |
| 10 | 40 | 3.8 | 30 |

In the process of each of these examples the plasticised thermoplastic composition delivered by the rolls was transferred to a roll mill one roll of which was at 140° C. and the other at 160° C., both rolls rotating at the same peripheral speed, and was worked thereon into a homogeneous sheet. This sheet while still hot was passed between corrugated rolls and the resulting scored sheet when cold was reduced to the form of moulding granules.

The following example illustrates the incorporation with cellulose acetate of a less viscous plasticiser than triacetin and one which becomes a solvent therefor only at elevated temperatures.

*Example 11*

The application of the plasticiser was carried out as described in Example 8 except that:

The plasticiser was diethyl phthalate; the nip-furnishing roll pass was 6 mils; the plasticiser incorporated was 27%; and in the final hot mixing the temperatures of the mixing rolls were 150 and 165° C., respectively.

It will be seen that at any given value of the nip-furnishing roll pass the plasticiser content was found to be independent of roll speed.

From the figures given above a graph can be constructed from which a suitable nip-furnishing roll pass can be read off for a desired plasticiser take up. Similar graphs can be constructed for other plasticisers and thermoplastics.

The process and apparatus of the invention may be advantageously used with a wide variety of thermoplastic materials and of plasticisers therefor. Other plasticisers for cellulose acetate include: dimethyl phthalate, dibutyl phthalate, and tripropionin. The viscosity of the plasticiser at 15–30° C. may for example range from 10–20 centistokes. Particularly good results have been obtained with plasticisers the viscosities of which range from 15–20 centistokes at 15–30° C. Other thermoplastics that can be plasticised in this way include other cellulose derivatives such as cellulose propionate, cellulose acetate-propionate, cellulose acetate-butyrate, ethyl cellulose and benzyl cellulose and thermoplastic polyvinyl compounds, for example polyvinyl chloride and copolymers of vinyl chloride with a minor proportion of vinyl acetate.

The application of plasticiser to a travelling body of thermoplastic material by bringing successive portions of the material into contact with a layer of the plasticiser carried on a rotating roll past which the material is carried, is thought to embody a new principle in compounding. The invention includes other methods than that specifically described for carrying the principle into effect. The thermoplastic material may, for example, be carried on a travelling belt past a driven roller on which a film of plasticiser is maintained, e.g. by continuous application from a furnishing roll.

Although in the preferred apparatus each nip-roll is furnished with plasticiser from a corresponding furnishing roll any suitable methods of supplying the layer of plasticiser on the nip-roll or nip-rollers may be employed.

Having described our invention, what we desire to secure by Letters Patent is:

1. Process for compounding finely-divided thermoplastic material with a plasticizer in liquid condition, which comprises continuously feeding the finely-divided thermoplastic material downwards at a substantially constant rate into the pass between two identical cylindrical surfaces rotating side by side at the same speed in opposite directions about parallel axes, the feed being effected at such a rate as to maintain a bank of said material within said pass, continuously supplying the liquid plasticizer at a substantially constant rate to each of said surfaces in a region remote from said pass in such a way as to maintain on said surface a layer of the plasticizer extending from said region into contact with said bank of material, allowing the material emerging from said pass to fall away from said surfaces and preventing any of said material from being carried by said surfaces into the region in which the plasticizer is applied.

2. Process for compounding finely-divided thermoplastic material with a plasticizer in liquid condition, which comprises continuously feeding the finely-divided thermoplastic material downwards at a substantially constant rate into the pass between two identical cylindrical surfaces rotating side by side at the same speed in opposite directions about parallel axes, the feed being effected at such a rate as to maintain a bank of said material within said pass, continuously supplying the liquid plasticizer at a substantially constant rate to each of said surfaces in a region remote from said pass in such a way as to maintain on said surface a layer of the plasticizer extending from said region into contact with said bank of material, the supply of plasticizer to each of said surfaces being effected by means of an auxilliary cylindrical surface partly submerged in a pool of the plasticizer and rotating at the same peripheral speed as, and in the opposite direction to said surface and almost in contact therewith.

3. Process for compounding finely-divided thermoplastic material with a plasticizer in liquid condition, which comprises continuously feeding the finely-divided thermoplastic material downwards at a substantially constant rate into the pass between two identical cylindrical surfaces rotating side by side at the same speed in opposite directions about parallel axes, the feed being effected at such a rate as to maintain a bank of said material within said pass, continuously supplying the liquid plasticizer at a substantially constant rate and at a substantially constant temperature between 15 and 30° C.

4. A process according to claim 3, wherein the ratio of plasticizer to thermoplastic material in the product is controlled by fine adjustment of the distance between the axis of each auxiliary cylindrical surface and that of the cylindrical surface which it supplies with plasticizer.

5. A proces for making a thermoplastic moulding composition, which comprises compounding finely-divided thermoplastic material with a liquid plasticizer according to claim 3, continuously feeding the compounded material to a heated cylindrical chamber, urging it along a substantially helical path through said chamber while effecting further mixing, extruding it from said chamber and cutting the extruded material into moulding granules.

6. A process for making a thermoplastic moulding composition, which comprises compounding finely-divided thermoplastic material with a liquid plasticizer according to claim 3, feeding the compounded material to the nip between a pair of heated cylindrical surfaces rotating at the same speed and in opposite directions about parallel axes, one of said surfaces being hotter than the other, effecting further mixing and conversion of said material by repeated passage through said nip, taking said material in the form of a sheet from said nip, corrugating it longitudinally by passage while still hot through the nip between circumferentially ridged cylindrical surfaces rotating at the same speed in opposite directions about parallel axes, and cutting the resulting corrugated sheet into moulding granules.

7. Process according to claim 3, wherein the thermoplastic material is an organic substitution derivative of cellulose.

8. Process according to claim 3, wherein the thermoplastic material is a cellulose ester of a parafinnic monocarboxylic acid containing 2 to 4 carbon atoms.

9. Process according to claim 3, wherein the thermoplastic material is cellulose acetate and the plasticizer has a viscosity of 10 to 20 centistokes at 50 to 30° C.

References Cited in the file of this patent

UNITED STATES PATENTS

| | | |
|---|---|---|
| 1,080,959 | Eaton | Dec. 9, 1913 |
| 1,380,632 | Bowden | June 7, 1921 |
| 1,788,610 | Ashworth et al. | Jan. 13, 1931 |
| 2,273,206 | Kuhn | Feb. 17, 1942 |
| 2,332,559 | Daly et al. | Oct. 26, 1943 |
| 2,372,894 | Gustin | Apr. 3, 1945 |
| 2,642,643 | Montague | June 23, 1953 |
| 2,688,306 | Fahrni | Sept. 7, 1954 |

FOREIGN PATENTS

| | | |
|---|---|---|
| 500,298 | Great Britain | Feb. 7, 1939 |